United States Patent [19]
Tagiri

[11] Patent Number: 5,784,574
[45] Date of Patent: Jul. 21, 1998

[54] CONTROL UNIT FOR DATA TRANSMISSION

[75] Inventor: Hirokazu Tagiri, Kyoto, Japan

[73] Assignee: Rohm Co., Ltd., Kyoto, Japan

[21] Appl. No.: 675,392

[22] Filed: Jul. 2, 1996

[30] Foreign Application Priority Data

Jul. 5, 1995 [JP] Japan ................... 7-169935

[51] Int. Cl.$^6$ ...................... G06F 13/00
[52] U.S. Cl. .............. 395/280; 395/444; 395/575; 395/725; 364/240; 364/230; 364/260
[58] Field of Search ................... 395/280, 444, 395/575, 725, 481; 365/233; 364/208

[56] References Cited

U.S. PATENT DOCUMENTS

| | | | |
|---|---|---|---|
| 4,760,524 | 7/1988 | Iwasaki et al. | 364/200 |
| 5,088,027 | 2/1992 | Tanagawa et al. | 395/575 |
| 5,327,393 | 7/1994 | Koyanagi | 365/233 |
| 5,386,573 | 1/1995 | Okamoto | 395/725 |
| 5,579,488 | 11/1996 | Ikeda | 395/280 |
| 5,584,010 | 12/1996 | Kawai et al. | 395/444 |
| 5,651,138 | 7/1997 | Le et al. | 395/481 |

*Primary Examiner*—Ayaz R. Sheikh
*Assistant Examiner*—Eric Thlang
*Attorney, Agent, or Firm*—Keiichi Nishimura

[57] ABSTRACT

A one-chip control unit for data transmission has a central processing unit for carrying out various processes according to a preliminarily stored program, a memory device for temporarily storing data processed by the central processing unit and data received from an external memory device, an input/output interface for connecting to the external memory device, bus lines connected to these components for transmitting signals therethrough, and a switch circuit for causing signals to pass through the bus lines along different routes, depending on address signals outputted from the central processing unit. The switch circuit may serve to connect the memory device with the input/output interface and to thereby enable signals to be continuously transmitted therebetween directly when the address signal outputted from the central processing unit are specifying an area on the memory device.

5 Claims, 2 Drawing Sheets

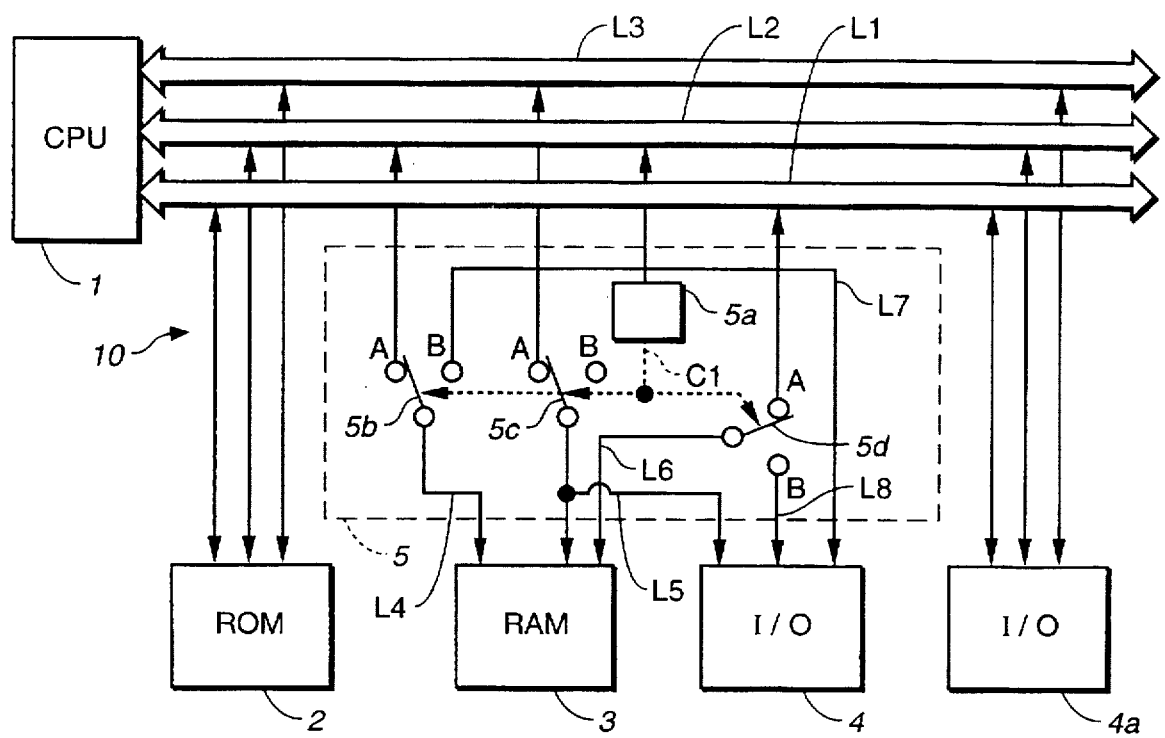
FIG._1

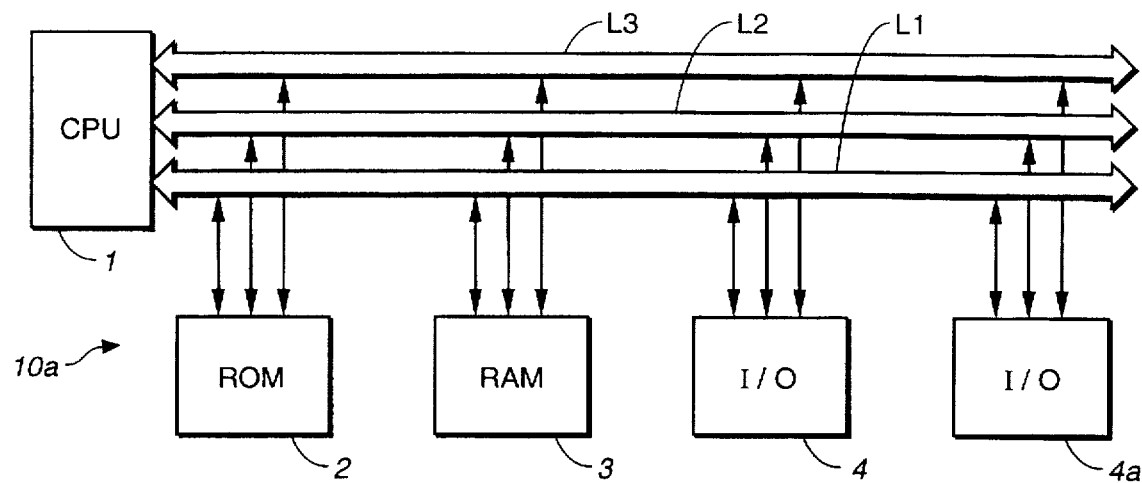
FIG._2
*(PRIOR ART)*
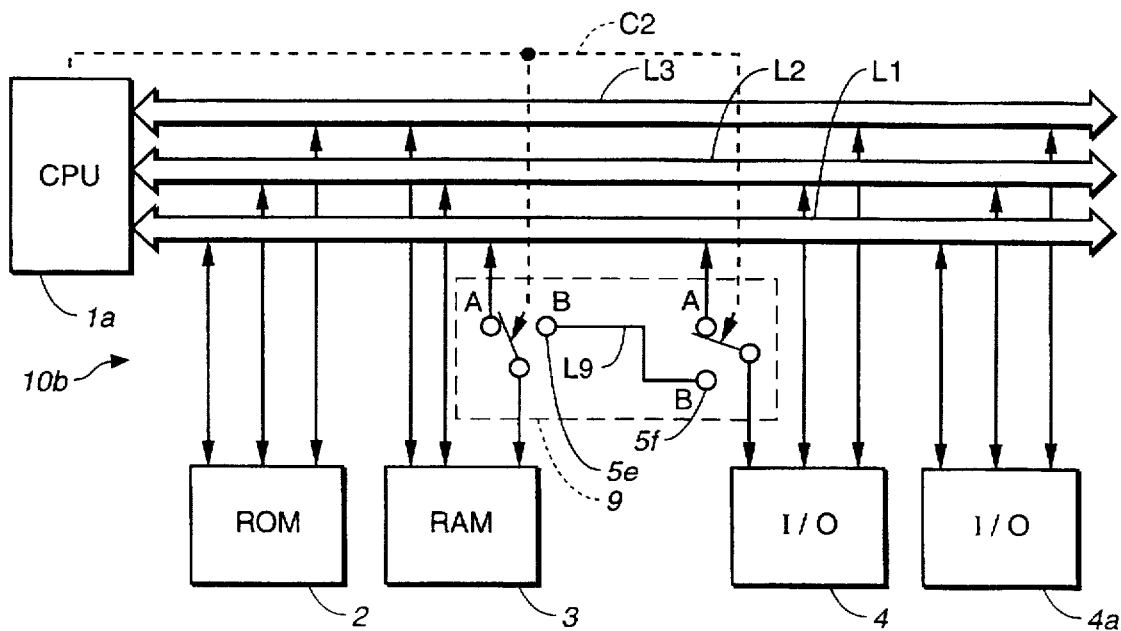
FIG._3
*(PRIOR ART)*

CONTROL UNIT FOR DATA TRANSMISSION

BACKGROUND OF THE INVENTION

This invention relates to a control unit and, more particularly, to the circuit structure of a control unit for data transmission.

When graphic and voice data are processed by a control unit of a personal computer comprising a microcomputer, external memory devices using disk-shaped memory media inclusive of magnetic memory disks such as floppy disks and hard disks, as well as optical memory disks are frequently used to read and write data. Prior art external memory devices of this kind, however, are usually slow in accessing, reading and writing data. In view of the above, it has been known to structure a control unit such that data from an external memory device are initially transmitted to a random-access memory (RAM) capable of accessing, reading and writing data faster than such an external memory device and that these data are then transmitted between the RAM and the central processing unit (CPU) adapted to carry out a program stored in a read-only memory (ROM).

FIG. 2 shows a prior art control unit 10a of a one-chip microcomputer type, comprising a ROM 2, which stores a program to be carried out, a CPU 1, a RAM 3, an input/output (I/O) interface 4 for connecting to an external memory device (not shown), another I/O interface 4a serving as a multi-purpose input/output terminal, and a plurality of bus lines (inclusive of a data bus L1, an address bus L2 and a control bus L3) for connecting them together. With a control unit thus structured, the CPU 1 first specifies the I/O interface 4 through the address bus L2 to take in data from the external memory device through the I/O interface 4 and the data bus L1 in response to a control signal through the control bus L3. Thereafter, the data thus transmitted to the CPU 1 may be transmitted to the RAM 3 similarly through the bus lines L1–L3, or the process may be reversed to transmit data already stored in the RAM 3 out thereof through the I/O interface 4.

FIG. 3 shows another control unit 10b with a different circuit structure adapted to carry out transfer of data continuously. The control unit 10b of FIG. 3 is similar to that shown in FIG. 2 except a switch circuit 9 with two switches 5e and 5f is connected between the RAM 3 and the bus lines connected to the I/O interface 4. with a control unit thus structured, the switches 5e, 5f of the switch circuit 9 are controlled by control signals C2 outputted from the CPU 1 according to a program stored in the ROM 2 such that it can be automatically controlled whether data should be transmitted between the CPU 1 and the RAM 3, as shown in FIG. 2, or data should be transferred continuously between the RAM 3 and the I/O interface 4 through a bus line L9 which connects the two switches 5e, 5f of the switch circuit 9.

Control circuits as shown in FIG. 2 are disadvantageous in that the efficiency of data transmission is poor and it takes a relatively long time to transfer data because data cannot be transferred continuously between the RAM 3 and the I/O interface 4. Control units as shown in FIG. 3 are disadvantageous, on the other hand, because a circuit for generating signals to be transmitted to the switch circuit 9 must be incorporated into the CPU 1a, say, by partially changing the layout structure of the CPU 1a which is already laid out at a very high density. At the time of the development of a program, furthermore, the program for the control of the switch circuit 9 must also be incorporated, and this means that the program itself becomes large and that the action timing of the incorporated program must be examined additionally by one who develops the program.

SUMMARY OF THE INVENTION

It is therefore an object of this invention to provide an improved control unit which is capable of high-speed transfer of data between its RAM and an external memory device connected thereto through its I/O interface and for which programs can be developed without regard to the timing of data transfers.

A control unit embodying this invention, with which the above and other objects can be accomplished, may be characterized as comprising a central processing unit for carrying out various processes according to a preliminarily stored program, a memory device for temporarily storing data processed by the central processing unit and data received from an external memory device, an input/output interface for connecting to the external memory device, bus lines connected to these components for transmitting signals therethrough, and a switch circuit for causing signals to pass through the bus lines along different routes, depending on address signals outputted from the central processing unit. The switch circuit may serve to connect the memory device with the input/output interface and to thereby enable signals to be continuously transmitted therebetween directly when the address signal outputted from the central processing unit are specifying an area on the memory device.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a block diagram of a control unit embodying this invention;

FIG. 2 is a block diagram of a prior art control unit; and

FIG. 3 is a block diagram of another prior art control unit.

Throughout herein, those components which are identical or substantially alike, although they are components of different control units, are indicated by the same symbols and not repetitively described.

DETAILED DESCRIPTION OF THE INVENTION

FIG. 1 shows a control unit 10 of a one-chip microcomputer type embodying this invention, characterized as comprising a ROM 2 wherein a program is preliminarily stored, a CPU 1 adapted to carry out various processes according to the program stored in the ROM 2, a RAM 3 for temporarily storing data processed by the CPU 1, as well as data from an external memory device (not shown), an I/O interface 4 for connecting the external memory device with the CPU 1, another I/O interface 4a serving as a multi-purpose input/output terminal, a plurality of bus lines for transmitting signals of various kinds between the various aforementioned components, and a switch circuit 5 for switching signal routes between the various components in response to address signals outputted from the CPU 1.

Explained more in detail, the plurality of bus lines include a data bus L1 for transmitting data signals, an address bus L2 for transmitting signals for specifying data positions and the I/O interface 4, and a control bus L3 for transmitting signals for controlling the timing of reading and writing data. The switch circuit 5 is provided on the bus lines between the CPU 1, the RAM 3 and the I/O interface 4, having switches (herein referred to as Switches 5b, 5c and 5d), which may be analog switches, and a decoder 5a for outputting a switch signal C1 for switching each of the switches 5b, 5c, 5d within a predetermined range of addresses.

Switches 5b, 5c, 5d are each a two-way switch adapted to selectively connect a common terminal with either of two other terminals herein referred to as Terminal A and Terminal B. Switch 5b has its Terminal A connected to the address bus L2, its Terminal B connected through another bus line L7 to the I/O interface 4 and its common terminal connected through still another bus line L4 to the RAM 3, being thereby adapted to specify an address in the RAM 3 by switching between address signals from the address bus L2 and those from the I/O interface 4. Switch 5c has its Terminal A connected to the control bus L3, its Terminal B serving as an open terminal, and its common terminal connected through still another bus line L5 to the RAM 3 and the I/O interface 4, being thereby adapted to control the timing of operations by the RAM 3 and the I/O interface 4 by switching between control signals from the control bus L3 and those from the I/O interface 4. Switch 5d has its Terminal A connected to the data bus L1, its Terminal B connected through still another bus line L8 to the I/O interface 4, and its common terminal connected still another bus line L6 to the RAM 3, being thereby adapted to transmit data to the RAM 3 by switching between data signals from the data bus L1 and those from the I/O interface 4.

With a control unit thus structured, if Terminal A of each of the switches 5b, 5c, 5d is "selected" by the switch signal C1, signals through the data bus L1 are transmitted to the RAM 3 and stored in a data area thereon specified through the address bus L2, according to the timing given by a control signal received through the control bus L3. If Terminal B of each of the switches 5b, 5c, 5d is "selected" by the switch signal C1, on the other hand, signals inputted through the I/O interface 4 are transmitted to the RAM 3 and stored in a data area thereon specified by address signals inputted through the I/O interface 4 according to the timing given by a control signal inputted through the I/O interface 4. Because the data transmission in this case does not take place through the CPU 1, data transmission can be effected continuously according to address signals and control signals inputted through the I/O interface 4.

Next, the switching operation by the switch circuit 5 will be described by way of an example with a 16-bit address bus. Let us assume for this example that the data area of the RAM 3 covers a space of 512 bytes from $FE00_H$ to $FFFF_H$. In this situation, it can be determined whether a data area of the RAM 3 is being specified or not by decoding the upper 7 bits of the 16-bit address bus L2 by means of the decoder 5a. If the decoder 5a thus decodes a signal on the address bus L2 and determines that the CPU 1 is currently using the address space described above, the switch signal C1 is outputted such that each switch 5b, 5c, 5d will connect to Terminal A because signals should then be transmitted between the CPU 1 and the RAM 3. Similarly, when the CPU 1 is found to be using an area different from the space described above, the switch signal C1 is outputted such that each switch 5b, 5c, 5d will connect to Terminal B because there is to be no data transmission between the CPU 1 and the RAM 3. In this situation, data transmission can be carried out continuously between the RAM 3 and the I/O interface 4 directly without going through the CPU 1.

In summary, the switch circuit 5 is capable of causing its decoder 5a to output switch signals C1 to the switches 5b, 5c, 5d automatically according to the signal through the address bus L2. Thus, the CPU does not have to be programmed (unlike the prior art example described above with reference to FIG. 3) to output control signals (such as C2 of FIG. 3) to the switch circuit every time data transmission is to be effected directly between the RAM 3 and the I/O interface 4. As a result, the present invention obviates the increase in the volume of program and programs can be developed without regard to the timing of operations.

Although this invention has been described above with reference to only one example, this is not intended to limit the scope of the invention. Many modifications and variations are possible within the scope of the invention. For example, the number of bits in each bus line does not limit the scope of the invention. The decoder 5a may be adapted to decode the entire address bus, or a plurality of decoders may be provided so as to automatically turn on and off the individual switches in different address areas. The RAM 3 may comprise a DRAM, a SRAM or a non-volatile RAM such as FLASH. Examples of external memory device include not only those which make use of a semiconductor memory device or a magnetic tape but also those that can be connected through light or electromagnetic waves.

As described above, control units according to this invention make it possible to continuously transmit data between a RAM and an I/O interface without modifying the circuit structure of the CPU. Thus, the highly dense layout of the CPU does not have to be modified, and semiconductor devices capable of high-speed data transmission can be developed within a short time. Since new programs can be developed according to the present invention without regard to the timing of data transmission, errors can be reduced in the development of new programs and new programs can be developed more easily and quickly.

What is claimed is:

1. A one-chip control unit for data transmission, said control unit comprising:

a central processing unit for carrying out various processes according to a preliminarily stored program;

a memory device for temporarily storing data processed by said central processing unit and data received from an external memory device;

an input/output interface for connecting to said external memory device;

bus lines, inclusive of an address bus, a data bus and a control bus, connected to said central processing unit, said memory device and said input/output interface for transmitting signals therethrough; and a switch circuit, including a decoder connected to said address bus and switches which are individually connected to said address bus, said data bus and said control bus and are each controlled by a switch signal outputted from said decoder, for causing signals to pass through said bus lines along different routes, depending on address signals outputted from said central processing unit to said address bus and received by said decoder, said switch circuit serving to connect said memory device with said input/output interface and to thereby enable signals to be continuously transmitted between said memory device and said input/output interface directly when said address signals outputted from said central processing unit are not specifying an area on said memory device.

2. The control unit of claim 1 further comprising a read-only memory which stores said program.

3. A one-chip control unit for data transmission, said control unit comprising:

a central processing unit for carrying out various processes according to a preliminarily stored program;

a memory device for temporarily storing data processed by said central processing unit and data received from an external memory device;

an input/output interface for connecting to said external memory device;

bus lines, inclusive of an address bus, a data bus and a control bus, connected to said central processing unit, said memory device and said input/output interface for transmitting signals therethrough; and a switch circuit, including a decoder connected to said address bus and switches which are individually connected to said address bus, said data bus and said control bus and are each controlled by a switch signal outputted from said decoder, for causing signals to pass through said bus lines along different routes, depending on address signals outputted from said central processing unit to said address bus and received by said decoder, said switches in said switch circuit including a first switch which serves to transmit signals between said memory device and selectably said address bus or said input/output interface, a second switch which serves to transmit signals between said memory device and selectably said data bus or said input/output interface, and a third switch which serves to transmit signals between said memory device and selectably said control bus or said input/output interface.

4. The control unit of claim 1 wherein said switches in said switch circuit include a first switch which serves to transmit signals between said memory device and selectably said address bus or said input/output interface, a second switch which serves to transmit signals between said memory device and selectably said data bus or said input/output interface, and a third switch which serves to transmit signals between said memory device and selectably said control bus or said input/output interface.

5. The control unit of claim 2 wherein said switches in said switch circuit include a first switch which serves to transmit signals between said memory device and selectably said address bus or said input/output interface, a second switch which serves to transmit signals between said memory device and selectably said data bus or said input/output interface, and a third switch which serves to transmit signals between said memory device and selectably said control bus or said input/output interface.

* * * * *